United States Patent
Kreiner et al.

(10) Patent No.: US 8,389,142 B2
(45) Date of Patent: Mar. 5, 2013

(54) METHOD AND APPARATUS FOR THE EXTERNAL APPLICATION OF A BATTERY PACK ADHESIVE

(75) Inventors: Paul Bryan Kreiner, Palo Alto, CA (US); Weston Arthur Hermann, Palo Alto, CA (US); Dorian Watkins West, Menlo Park, CA (US); Morgan Daniel Adis, Sunnyvale, CA (US); Ernest Matthew Villanueva, San Mateo, CA (US); Noel Jason Mendez, Mountain View, CA (US); William Vucich Beecher, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 783 days.

(21) Appl. No.: 12/586,846

(22) Filed: Sep. 28, 2009

(65) Prior Publication Data

US 2011/0076538 A1 Mar. 31, 2011

(51) Int. Cl.
  *H01M 2/10* (2006.01)
(52) U.S. Cl. .................................................... 429/100
(58) Field of Classification Search ............. 429/96–100
  See application file for complete search history.

(56) References Cited

U.S. PATENT DOCUMENTS

| | | | | |
|---|---|---|---|---|
| 4,797,764 | A | * | 1/1989 | Doering ......................... 360/135 |
| 4,994,540 | A | * | 2/1991 | Boerner et al. .................. 528/44 |
| 6,410,185 | B1 | * | 6/2002 | Takahashi et al. ............ 429/163 |
| 2007/0009787 | A1 | | 1/2007 | Straubel et al. |
| 2007/0188147 | A1 | | 8/2007 | Straubel et al. |
| 2008/0241667 | A1 | | 10/2008 | Kohn et al. |
| 2009/0023060 | A1 | | 1/2009 | Villanueva et al. |

* cited by examiner

*Primary Examiner* — Maria J Laios
(74) *Attorney, Agent, or Firm* — Patent Law Office of David G. Beck

(57) ABSTRACT

A method and apparatus for simplifying battery pack assembly that allows inspection of the cell-to-housing bonding region is provided. In particular, a battery pack housing member is provided that includes an interior surface that partially defines the interior region of the battery pack and that includes a plurality of cell mounting wells and an exterior surface that includes a plurality of bonding wells. Adhesive introduced into the bonding wells forms a mechanical bond between an exterior surface of a cell introduced into an adjacent cell mounting well and the housing member.

19 Claims, 5 Drawing Sheets

METHOD AND APPARATUS FOR THE EXTERNAL APPLICATION OF A BATTERY PACK ADHESIVE

FIELD OF THE INVENTION

The present invention relates generally to battery packs and, more particularly, to a method and apparatus for efficiently bonding a plurality of cells within a battery pack.

BACKGROUND OF THE INVENTION

Battery packs, also referred to as battery modules, have been used for years in a variety of industries and technologies that include everything from portable electric tools and laptop computers to small hand-held electronic devices such as cell phones, MP3 players, and GPS units. In general, a battery pack is comprised of multiple individual batteries, also referred to as cells, contained within a single piece or multi-piece housing. Single piece housings are often comprised of shrink-wrap while multi-piece housings often rely on a pair of complementary housing members that are designed to fit tightly around the cells when the housing members are snapped or otherwise held together. Typically a conventional battery pack will also include means to interconnect the individual cells as well as circuitry to, enable charging and/or to protect against overcharging.

Battery packs offer a number of advantages over the use of individual battery cells. From the end user's perspective, combining multiple cells into a single housing simplifies battery removal, replacement and/or battery recharging, since the user is only required to deal with a single unit. From the manufacturer's perspective, the use of battery packs provides additional marketing flexibility. For example, a manufacturer may offer a variety of interchangeable battery packs at different price points for the same device(s), the different battery packs providing different capacities, cell types (e.g., lithium ion versus nickel-metal-hydrid), or other variations. A manufacturer may also find it advantageous to market multiple devices that all utilize a single, interchangeable battery pack.

Recent advances in the development of hybrid and electric vehicles have lead to the need for a new type of battery pack, one capable of housing hundreds to thousands of individual cells and surviving the inherent thermal and mechanical stresses of a car for a period of years. Additionally, while the housing used to package a multi-cell vehicle battery must be structurally sound enough to allow battery pack inspection and/or replacement, it must do so with minimal weight since hybrids and electric cars are exceptionally sensitive to excess weight. Lastly, the design of a vehicle battery pack should lend itself to efficient, and preferably automated, manufacturing practices. The present invention provides such a battery pack.

SUMMARY OF THE INVENTION

The present invention provides a battery pack housing member that simplifies battery pack assembly and allows inspection of the cell-to-housing bonding region. In at least one embodiment of the invention, the battery pack housing member is comprised of (i) an interior surface that partially defines the interior region of the battery pack and that includes a plurality of cell mounting wells, each of which is adapted to receive a first end portion of a corresponding cell of a plurality of cells, and (ii) an exterior surface that includes a plurality of bonding wells, each of which is defined, in part, by an exterior surface of the first end portion of the corresponding cell. Adhesive, preferably a sag-resistant and/or high viscosity adhesive, introduced into the bonding wells forms a bond between the corresponding cell and the housing member. The sag-resistant and/or high viscosity characteristic of the adhesive minimizes and/or prevents seepage of the adhesive through the radial gap formed between the mounting well of the housing member and the corresponding cell. A feature, such as a bonding well surface protrusion, may be used to reduce the volume within the bonding well which, in turn, reduces the volume of adhesive needed to fill the bonding well. The exterior surface of each of the cell mounting wells may include an interconnect aperture, the interconnect aperture providing access to the first end portion of the corresponding cell.

In at least one embodiment of the invention, a battery pack is provided that is comprised of (i) a first housing member that includes a first plurality of cell mounting wells formed within the interior surface of the housing member and a first plurality of bonding wells formed within the exterior surface of the housing member, where the first plurality of cell mounting wells is adapted to receive a first end portion of a corresponding cell of a plurality of cells; (ii) a second housing member complementary to the first housing member that includes a second plurality of cell mounting wells formed within the interior surface of the second housing member and a second plurality of bonding wells formed within the exterior surface of the second housing member, where the second plurality of cell mounting wells is adapted to receive a second end portion of a corresponding cell of the plurality of cells; (iii) a plurality of cells; (iv) a first adhesive introduced into the first plurality of bonding wells, the first adhesive forming a bond between the exterior surfaces of the first end portions of the cells and the first housing member; and (v) a second adhesive introduced into the second plurality of bonding wells, the second adhesive forming a bond between the exterior surfaces of the second end portions of the cells and the second housing member. Sag-resistant and/or high viscosity adhesives may be used for the first and second adhesives. The sag-resistant and/or high viscosity characteristic of the adhesive minimizes and/or prevents seepage of adhesive through the radial gap formed between the housing member mounting wells and the corresponding cells. A feature, such as a bonding well surface protrusion, may be used to reduce the volume within the first and second pluralities of bonding wells. The exterior surfaces of each of the first and second pluralities of cell mounting wells may include first and second pluralities of interconnect apertures, thereby providing access to the first and second cell end portions. The battery pack may further comprise a first connector plate bonded to the exterior surface of the first housing member and a second connector plate bonded to the exterior surface of the second housing member.

In a least one embodiment of the invention, a method of manufacturing a battery pack is provided, the method comprising the steps of (i) inserting a first end portion of each of a plurality of cells into a corresponding cell mounting well in an interior surface of a first housing member; (ii) inserting a second end portion of each of the plurality of cells into a corresponding cell mounting well in an interior surface of a second housing member; (iii) introducing a first adhesive into a first plurality of bonding wells within an exterior surface of the second housing member, where the first adhesive forms a bond between an exterior surface of the second end portions of the plurality of cells and the second housing member; (iv) rotating the battery pack; and (v) introducing a second adhesive into a second plurality of bonding wells within an exterior surface of the first housing member, where the second adhesive forms a bond between an exterior surface of the first end portions of the plurality of cells and the first housing member. The method may further comprise the steps of (i) bonding a first connector plate to the second housing member exterior surface and (ii) bonding a second connector plate to the first housing member exterior surface.

A further understanding of the nature and advantages of the present invention may be realized by reference to the remaining portions of the specification and the drawings.

DESCRIPTION OF THE SPECIFIC EMBODIMENTS

In the following text, the terms "battery", "cell" and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "connector plate" and "collector plate" may be used interchangeably and refer to a plate used to electrically connect to multiple batteries within a battery pack. It should be understood that identical element symbols used on multiple figures refer to the same component, or components of equal functionality. Additionally, the accompanying figures are only meant to illustrate, not limit, the scope of the invention and should not be considered to be to scale. Accordingly, not all battery elements and/or battery pack elements are shown in the illustrations.

Figure 1:
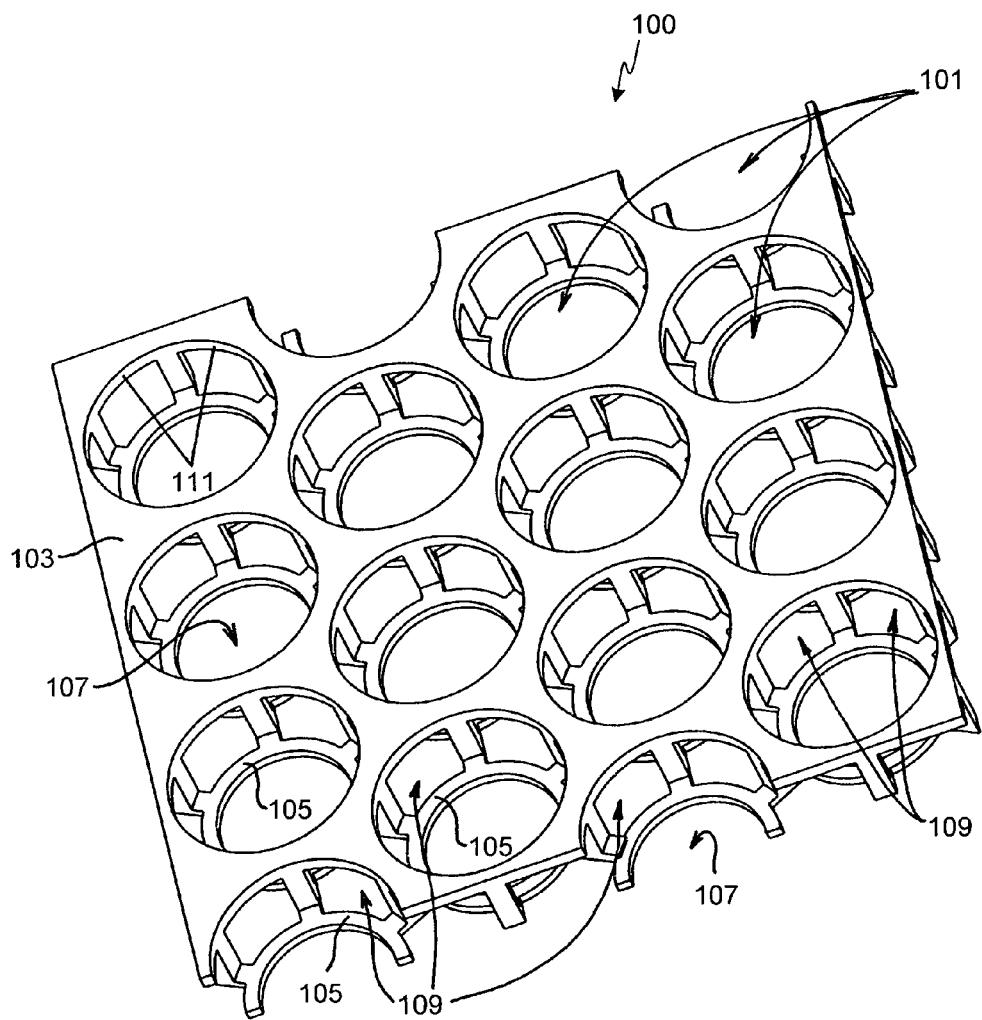
FIG. 1 illustrates a portion of a battery pack housing member, this view providing both a perspective view of the member as well as a cross-sectional view of some of the plurality of battery cell mounting wells.

FIG. 1 illustrates a portion of a battery pack housing member 100, this view providing both a perspective view of member 100 as well as a cross-sectional view of some of the plurality of battery cell mounting wells 101. It will be appreciated that the present invention is not limited to a particular number of cell mounting wells or cells, nor is the invention limited to a particular cell packing density or cell layout. Member 100 may comprise either the outermost structural member of a battery pack, or member 100 may comprise an internal component of a battery pack. In the latter approach, in addition to the inclusion of a connector plate as preferred and as described further below, an outer battery pack housing is fit around member(s) 100. An outer battery pack housing (not shown) provides additional environmental protection to the batteries and interconnects as well as increasing battery pack rigidity and strength. In some instances, the additional outer battery pack housing may be used to simplify battery pack mounting, for example by providing pack mounting structures.

In at least one preferred embodiment, a battery pack uses a pair of battery pack housing members 100, one such member being coupled to one end portion of each of the cells, and a second such member being coupled to the opposite end portion of each of the cells. Accordingly, while the description and figures provided below describe the design and use of a single housing member 100, it will be appreciated that preferably a battery pack in accordance with the invention would use a pair of complementary housing members to mount and hold the cells in place.

Figure 2:
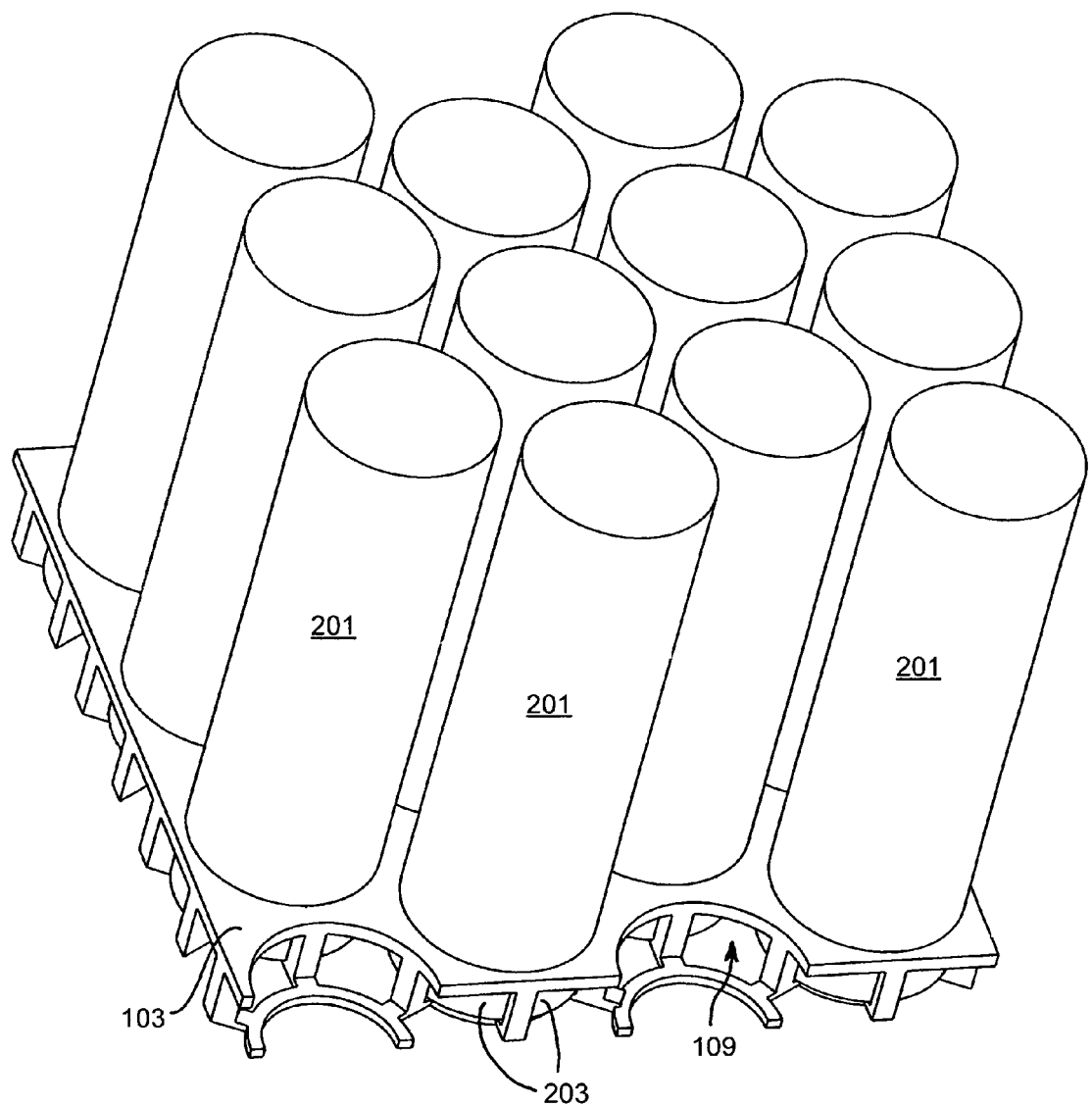
FIG. 2 illustrates the same portion of the battery pack housing member shown in FIG. 1, with the addition of battery cells inserted into most of the cell mounting wells.

In the view of member 100 shown in FIG. 1, surface 103 is the interior surface of member 100, this surface being oriented towards the inside region of the battery pack in which member 100 is used. Cell mounting wells 101 are configured to fit around the circumference of the cells with each mounting well 101 configured to accommodate a single battery cell. This aspect of the housing member is illustrated in FIG. 2 in which a plurality of cells 201 are shown fitted within cell mounting wells 101. Preferably cells 201 are lithium ion batteries utilizing an 18650 form-factor, although it will be appreciated that the invention is not limited to a specific cell chemistry, design, shape or configuration. As illustrated in these figures, interior housing member surface 103 is uninterrupted except for the inclusion of cell mounting wells 101.

Figure 3:
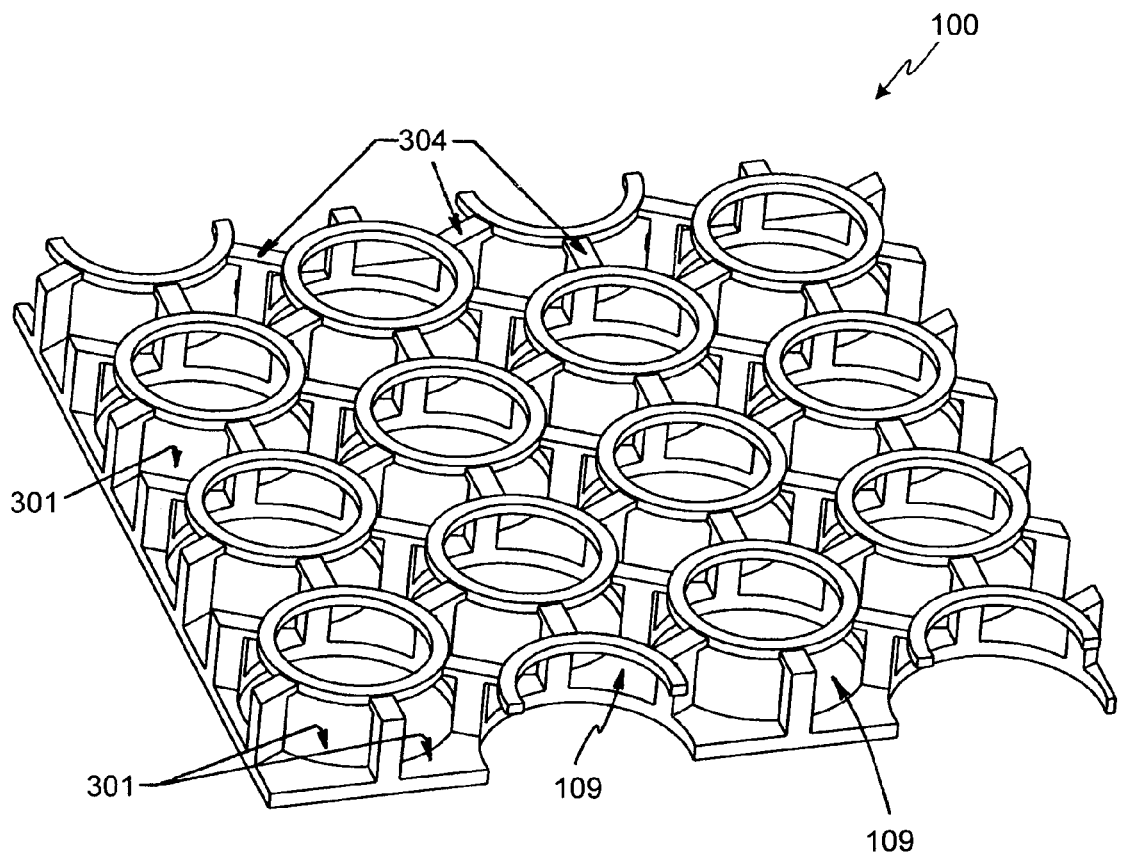
FIG. 3 illustrates the battery pack housing member shown in FIGS. 1 and 2, rotated to provide a better view of the exterior surface of the housing member.
Figure 4:
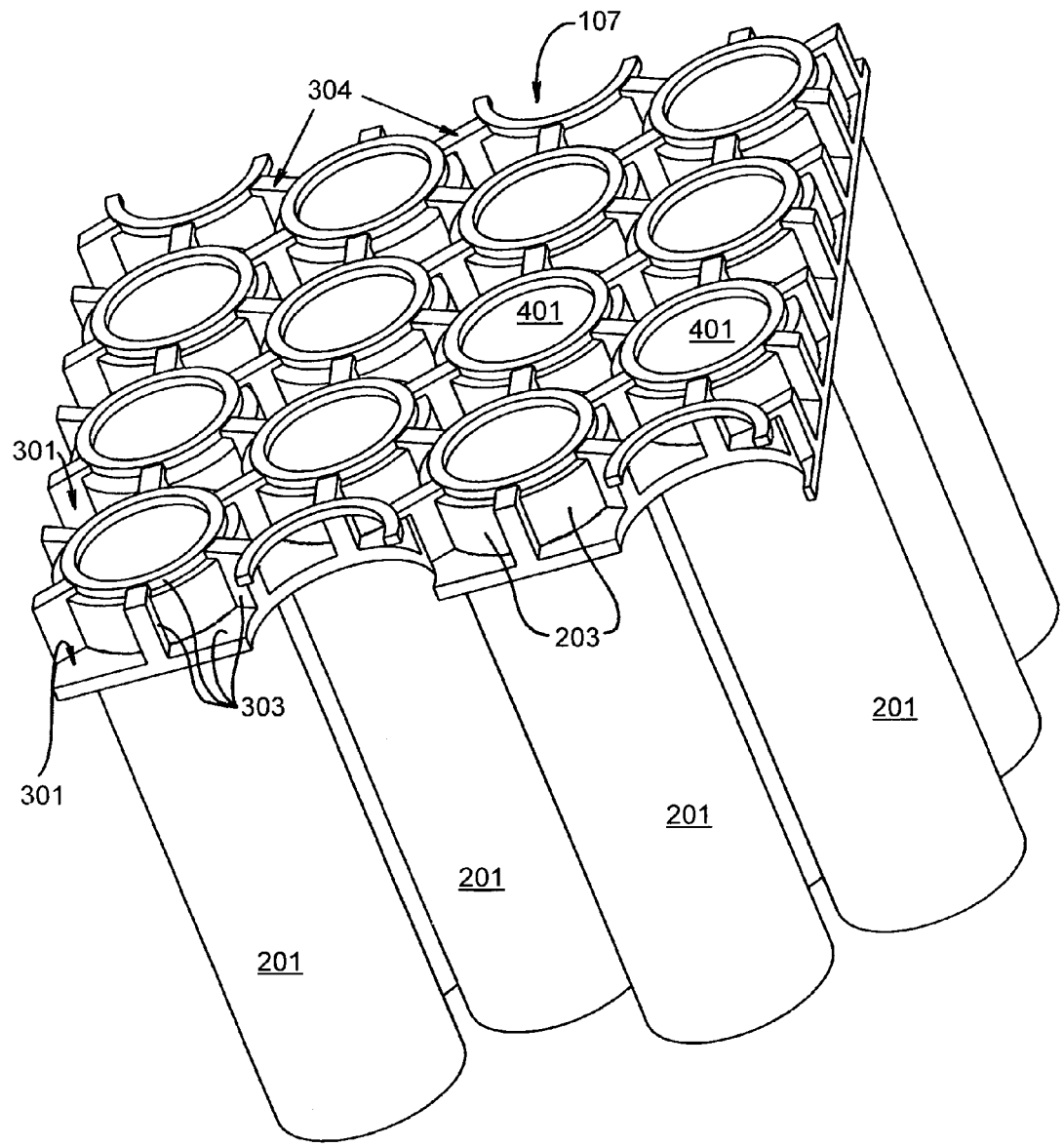
FIG. 4 illustrates the same portion of the battery pack housing member shown in FIG. 3, with the addition of battery cells inserted into most of the cell mounting wells.

FIGS. 3 and 4 provide perspective and cross-sectional views of the exterior surfaces of housing member 100, without and with included cells, respectively. As shown in FIGS. 1-4, the housing member is designed such that the end surfaces 401 of cells 201 fit against surface 105 of the exterior structural layer of member 100. Preferably, and as shown, surfaces 105 include an aperture 107, thus providing a point of contact for electrically coupling the cells to a connector plate, wiring harness, or other electrical interconnect. The removal of interconnect apertures 107 from surfaces 105 has the added advantage of further reducing the weight of member 100. It will be appreciated that the invention does not require apertures 107, depending upon the means used to electrically connect to the cells. For example, in an alternate configuration (not shown) apertures 107 are eliminated and a wiring harness is integrated within the housing member.

As shown in FIGS. 3 and 4, located between adjacent cell mounting wells 101 are bonding wells 301. Bonding wells 301 are accessed from the exterior side of housing member 100. Within each bonding well 301 are one or more cell cutouts or windows 109. As a result of cutouts 109, when cells 201 are positioned within housing member 100, each bonding well 301 is formed, in part, by exterior cell surfaces 203. The remaining surfaces of each bonding well 301 are comprised of internal housing member surfaces 303. As each bonding well is comprised of both cell exterior surfaces and housing member surfaces, when the bonding well is filled with an adhesive, a mechanical bond is formed between the housing member and the cells contained therein. Although not shown, if desired a third component, such as a cell interconnect connector plate, may be fitted on top of the exterior surface of housing member 100, with the connector plate preferably being bonded to the housing member by the adhesive located on top of bond surfaces 304.

Battery pack housing member 100 may be fabricated from any of a variety of materials. Preferably the selected material is not electrically conductive, thus preventing inadvertent cell shorting. In addition, preferably the selected material is light weight, easily manufactured, and capable of forming a strong bond with the selected adhesive. Exemplary materials include composite materials and any of a variety of polymers, e.g., a thermoplastic such as a polycarbonate/ABS (acrylonitrile/butadiene/styrene) blend.

During battery pack fabrication, after insertion of cells 201 into mounting wells 101, the housing member is oriented in a manner such as that shown in FIG. 4, thus allowing direct access to bonding wells 301. Typically housing member 100 is sized such that only a small portion of cells 201 are inserted into wells 101, for example, less than 20% of the length of cells 201, more preferably less than 10% of the length of cells 201, and still more preferably less than 5% of the length of cells 201. An adhesive is then introduced into the bonding wells. Due to the fit between the exterior surface of cells 201 and adjacent surface 111 of cell mounting wells 101, little, if any, adhesive seeps through the radial gap between these surfaces. To aid in minimizing adhesive seepage through this gap, especially in light of the typical cell diameter variations encountered during manufacturing, preferably a high viscosity or non-sag or sag resistant adhesive is used. Exemplary non-sag and sag resistant adhesives include Loctite® E-120HP, Loctite® H3151, Loctite® 3414, and Loctite® H3300. It will be appreciated that the invention is not limited to these specifically-identified adhesives.

As previously noted, a connector plate may be bonded to the exterior surface of housing member 100, preferably during the same bonding step as that used to bond cells 201 within mounting wells 101. In such a configuration, preferably the connector plates include apertures that correspond to apertures 107, thus allowing an interconnect such as a wirebond to be coupled between the connector plate and the end surface 401 of the corresponding cell. Preferably such a connector plate also includes one or more indentations that provide positive positioning of the connector plate relative to the housing member, and also ensure one or more bonding surfaces that are aligned with the bonding wells, or with connector plate specific bonding wells (not shown).

As described above, using the housing member of the present invention allows the cell/housing adhesive to be introduced from outside the battery pack, or at least outside this portion of the battery pack, where the bond formed between the housing and the cells is clearly visible. This is in marked contrast to a battery pack, such as that disclosed in co-pending U.S. patent application Ser. No. 12/315,303, in which the battery pack adhesive, also referred to as an encapsulant, is introduced through housing member ports into the central region of the battery pack, thus preventing, or at least making it difficult, to inspect the bonds.

Figure 5:
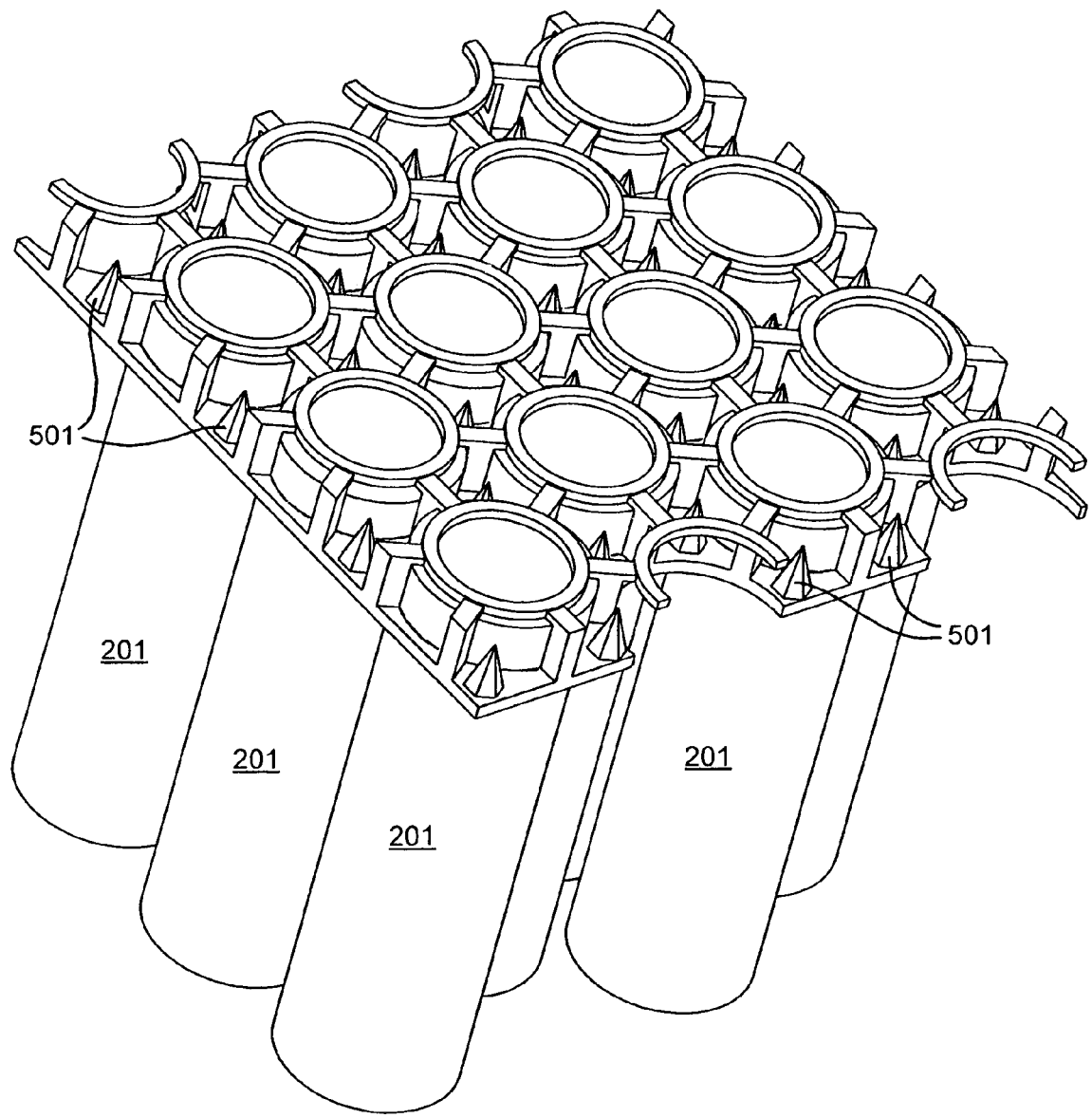
FIG. 5 illustrates an alternate battery pack housing member in which housing member features protrude into each bonding well, thereby decreasing adhesive volume.

FIG. 5 illustrates a minor modification of the previously described embodiment. As shown, within each bonding well 301 is located at least one bonding well feature 501 that is integral to housing member 100. Preferably bonding well feature 501 is a protrusion(s) formed on a surface 303 of the housing member, for example during the fabrication of the housing member. Feature 501 reduces the volume of adhesive required within each bonding well 101 which, in turn, may decrease curing time, assembly weight, and assembly cost. Additionally, feature(s) 501 provide additional bonding surfaces, thereby increasing the mechanical strength of the bond formed between the cells and the housing member.

It will be appreciated that the present invention lends itself to both manual and automated battery pack manufacturing processes. For example, in one preferred process the first end portions of all of the cells are inserted into the corresponding cell wells within the first housing member, for example a housing member 100 such as that illustrated in FIG. 1. Once the cells are properly seated within the cell mounting wells of the housing member, a complementary housing member is positioned over the second end portions of the cells such that the second end portion of each cell is inserted within the corresponding cell well of the complementary housing member. As the housing members are preferably small relative to the overall cell length, as previously noted, after battery pack assembly there remains a gap between the complementary housing members. As a result of this configuration, the cells are the primary source of battery pack structural integrity. It should be understood that other configurations can also be used with the invention, for example configurations in which the housing members are large enough to completely encase the cells (i.e., where approximately half the length of each cell is within each housing member). In such a configuration, one or more latching mechanisms may be used to secure the two members together. In addition to using any of a variety of different latching mechanisms, other means can be used to secure the two housing members together in such a configuration. For example, the mating surfaces of the housing members can be ultrasonically welded together, or bonded together with a suitable adhesive.

Once the battery pack is assembled, the adhesive is added to the bonding wells of the uppermost housing member. Preferably the adhesive is introduced using an automated system. Because the individual bonding wells 301 are separated by bonding shelves 304, the adhesive may be dispensed in a continuous bead, which may be easier to automate and control. This is in marked contrast to a battery pack, such as that disclosed in co-pending U.S. patent application Ser. No. 12/315,303, in which the battery pack adhesive, also referred to as an encapsulant, is introduced through individual housing member ports into the central region of the battery pack, thus requiring the adhesive to be dispensed in discreet shots.

After the adhesive is either sufficiently cured or sufficiently captured in place, the battery pack is rotated, i.e., flipped-over, and adhesive is then added to the bonding wells of the complementary housing member. The adhesive may be captured, for example, by adding a connector plate as previously described. In the preferred manufacturing process, after the adhesive is dispensed into the bonding wells and bonding shelves, the connector plate is mated to the housing member and fixtured in place, for example with snap or press-fit features on the connector plate and the housing member. Once fixtured, the connector plate seals the adhesive in the desired bonding regions, allowing the battery pack to be rotated without permitting the adhesive to seep out. Adhesive can then be dispensed into the bonding wells and bonding shelves of the complementary housing member. Assuming a complementary connector plate is fixtured in place, the adhesive linking the cells and connector plates to the housing members on both ends of the battery pack can be allowed to cure simultaneously. This is in marked contrast to a battery pack, such as that disclosed in co-pending U.S. patent application Ser. No. 12/315,303, in which the battery pack adhesive, also referred to as an encapsulant, is dispensed into an open cavity, thus requiring the adhesive to cure significantly or completely before the battery pack can be rotated.

In the preferred manufacturing process, and as described above, the battery pack is assembled prior to adding adhesive to either housing member. In an alternate manufacturing process, cell mounting fixtures are used to position the cells during the positioning and bonding of the first housing member. Once the adhesive is sufficiently cured, the structure is rotated, thus allowing the complementary housing member to be positioned and bonded to the cells. A disadvantage of this approach, however, is that a cell may be out of alignment when it is bonded to the first housing member, thereby preventing a straightforward integration of the cells into the second, complementary housing member.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack housing member configured to be integrated into a battery pack, the battery pack housing member comprising:
    an interior surface partially defining an interior region of said battery pack;
    a plurality of cell mounting wells formed within said interior surface, wherein each cell mounting well of said plurality of cell mounting wells is adapted to receive a first end portion of a corresponding cell of a plurality of cells, wherein said interior surface uninterruptedly separates said plurality of cell mounting wells from each other, wherein each cell mounting well includes a plurality of side wall cutouts, wherein each of said plurality of side wall cutouts provides an opening between an interior portion of a corresponding cell mounting well and an exterior region of said battery pack housing member, and wherein said opening corresponding to each of said plurality of side wall cutouts provides direct access between said exterior region of said battery pack housing and said first end portion of said corresponding cell of said plurality of cells;
    an exterior surface of said battery pack housing member; and
    a plurality of bonding wells, said plurality of bonding wells formed within regions separating said plurality of mounting wells, wherein each of said plurality of bonding wells is defined by said exterior surface of said battery pack housing member and by an exterior surface of said first end portion of multiple cells of said plurality of cells that border said bonding well.

2. The battery pack housing member of claim 1, further comprising an adhesive introduced into each of said plurality of bonding wells, said adhesive forming a bond between said exterior surfaces of said first end portions of said multiple cells of said plurality of cells that border the corresponding bonding well of said plurality of bonding wells and said exterior surface of said battery pack housing member.

3. The battery pack housing member of claim 2, wherein said interior surface uninterruptedly separating said plurality of cell mounting wells from each other minimizes flow of said adhesive onto a second portion of said plurality of cells.

4. The battery pack housing member of claim 2, wherein said interior surface uninterruptedly separating said plurality of cell mounting wells from each other prevents said adhesive from flowing onto a second portion of said plurality of cells.

5. The battery pack housing member of claim 2, wherein said adhesive is a sag-resistant adhesive.

6. The battery pack housing member of claim 2, wherein said adhesive is a high viscosity adhesive.

7. The battery pack housing member of claim 1, further comprising at least one bonding well volume reducing feature within each of said plurality of bonding wells.

8. The battery pack housing member of claim 1, further comprising at least one protrusion from a bonding well surface of each of said plurality of bonding wells, wherein said at least one protrusion reduces a corresponding bonding well volume.

9. The battery pack housing member of claim 1, wherein said exterior surface of said battery pack housing member further comprises a plurality of interconnect apertures corresponding to said plurality of cell mounting wells, wherein each of said plurality of interconnect apertures provides access through said battery pack housing member to said first end portion of said corresponding cell of said plurality of cells.

10. A battery pack, comprising:
    a plurality of cells;
    a first housing member having a first housing member interior surface partially defining an interior region of said battery pack, wherein said first housing member interior surface includes a first plurality of cell mounting wells, wherein each cell mounting well of said first plurality of cell mounting wells is adapted to receive a first end portion of a corresponding cell of said plurality of cells, wherein each cell mounting well of said first plurality of cell mounting wells includes a first plurality of side wall cutouts, wherein each of said first plurality of side wall cutouts provides an opening between an interior portion of a corresponding cell mounting well and an exterior region of said first housing member, wherein said opening corresponding to each of said first plurality of side wall cutouts provides direct access between said exterior region of said first housing member and said first end portion of said corresponding cell of said plurality of cells, wherein said first housing member is further comprised of a first housing member exterior surface, wherein said first housing member exterior surface includes a first plurality of bonding wells formed within regions separating said first plurality of mounting wells, wherein each of said first plurality of bonding wells is defined by said first housing member exterior surface and by an exterior surface of said first end portion of multiple cells of said plurality of cells that border said bonding well;
    a second housing member complementary to said first housing member and having a second housing member interior surface partially defining said interior region of said battery pack, wherein said second housing member interior surface includes a second plurality of cell mounting wells, wherein each cell mounting well of said second plurality of cell mounting wells is adapted to receive a second end portion of a corresponding cell of said plurality of cells, wherein each cell mounting well of said second plurality of cell mounting wells includes a second plurality of side wall cutouts, wherein each of said second plurality of side wall cutouts provides an opening between an interior portion of a corresponding cell mounting well and an exterior region of said second housing member, wherein said opening corresponding to each of said second plurality of side wall cutouts provides direct access between said exterior region of said second housing member and said second end portion of said corresponding cell of said plurality of cells, wherein said second housing member is further comprised of a second housing member exterior surface, wherein said second housing member exterior surface includes a second plurality of bonding wells formed within regions separating said second plurality of mounting wells, wherein each of said second plurality of bonding wells is defined by said second housing member exterior surface and by an exterior surface of said second end portion of multiple cells of said plurality of cells that border said bonding well;

a first adhesive introduced into each of said first plurality of bonding wells, said first adhesive forming a bond between said exterior surfaces of said first end portions of said multiple cells of said plurality of cells that border the corresponding bonding well of said first plurality of bonding wells and said first housing member exterior surface; and a second adhesive introduced into each of said second plurality of bonding wells, said second adhesive forming a bond between said exterior surfaces of said second end portions of said multiple cells of said plurality of cells that border the corresponding bonding well of said second plurality of bonding wells and said second housing member exterior surface.

11. The battery pack of claim 10, wherein said first housing member interior surface uninterruptedly separating said first plurality of cell mounting wells from each other minimizes flow of said first adhesive onto a central portion of said plurality of cells, and wherein said second housing member interior surface uninterruptedly separating said second plurality of cell mounting wells from each other minimizes flow of said second adhesive onto said central portion of said plurality of cells.

12. The battery pack of claim 10, wherein said first housing member interior surface uninterruptedly separating said first plurality of cell mounting wells from each other prevents said first adhesive from flowing onto a central portion of said plurality of cells, and wherein said second housing member interior surface uninterruptedly separating said second plurality of cell mounting wells from each other prevents said second adhesive from flowing onto said central portion of said plurality of cells.

13. The battery pack of claim 10, wherein said first and second adhesives are sag-resistant adhesives.

14. The battery pack of claim 10, wherein said first and second adhesives are high viscosity adhesives.

15. The battery pack of claim 10, further comprising at least one bonding well volume reducing feature within each of said first and second pluralities of bonding wells.

16. The battery pack of claim 10, further comprising at least one protrusion from a bonding well surface of each of said first and second pluralities of bonding wells, wherein said at least one protrusion reduces a corresponding bonding well volume.

17. The battery pack of claim 10, wherein said first housing member exterior surface further comprises a first plurality of interconnect apertures corresponding to said first plurality of cell mounting wells, wherein said second housing member exterior surface further comprises a second plurality of interconnect apertures corresponding to said second plurality of cell mounting wells, wherein each of said first plurality of interconnect apertures provides access through said first housing member to said first end portions of said corresponding cell of said plurality of cells, and wherein each of said second plurality of interconnect apertures provides access through said second housing member to said second end portions of said corresponding cell of said plurality of cells.

18. The battery pack of claim 17, further comprising a first connector plate attached to said first housing member exterior surface and a second connector plate attached to said second housing member exterior surface.

19. The battery pack of claim 18, wherein said first connector plate is attached to said first housing member exterior surface with said first adhesive, and wherein said second connector plate is attached to said second housing member exterior surface with said second adhesive.

* * * * *